2,801,207

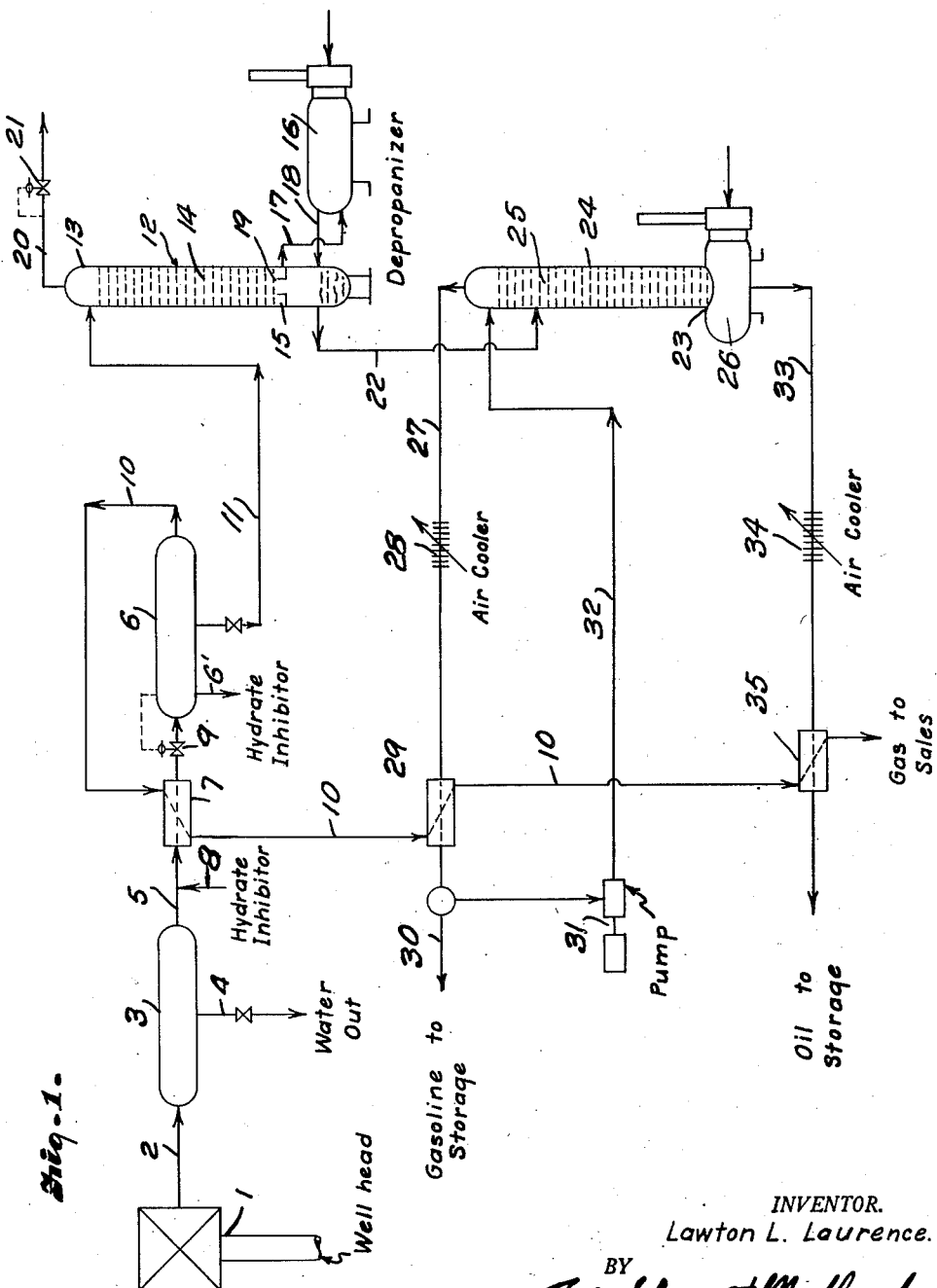

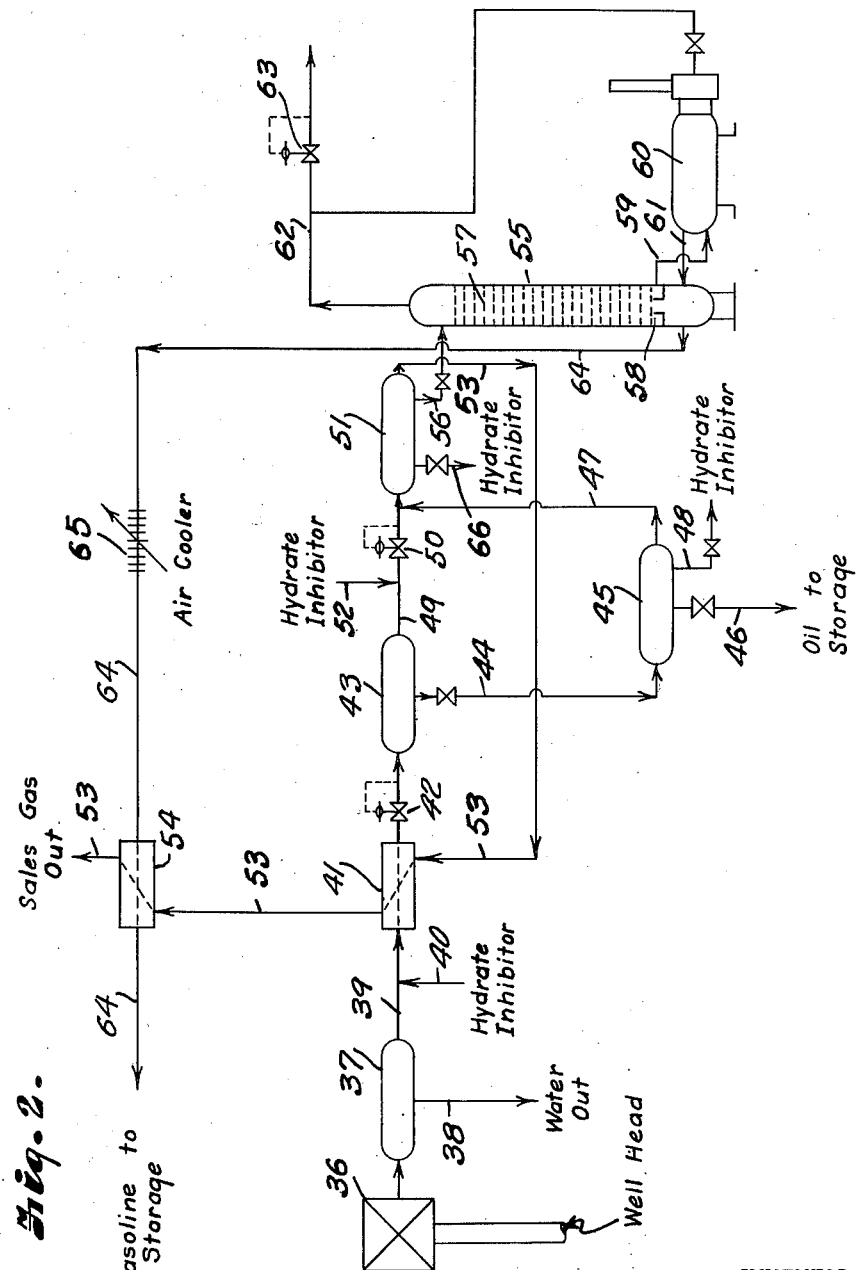

METHOD OF AND APPARATUS FOR RECOVERING DESIRABLE HYDROCARBON LIQUIDS FROM HIGH PRESSURE WELLS

Lawton L. Laurence, Oklahoma City, Okla., assignor to Black, Sivalls & Bryson, Inc., Kansas City, Mo., a corporation of Delaware Application October 8, 1952, Serial No. 313,772

7 Claims. (Cl. 196—7)

This invention relates to a method of and apparatus for recovering desirable hydrocarbon liquids from high pressure wells flowing mixtures of gas, water and high gravity oil.

The principal object of the invention is to obtain from the well flow an optimum quantity of a stabilized gasoline product, a standard gravity pipe line oil and a required grade of sales gas thereby affording income for the producer in addition to the usual income from gas and oil.

The invention involves optimum condensate recovery of the desirable light hydrocarbons by low temperature separation and subsequent topping of the oil and stabilizing of the recovered condensate by fractionation. Therefore, it is a further object of the invention to provide a process whereby the cold gas resulting from low temperature separation is utilized to cool the gasoline product, the pipe line oil and to precool the well flow.

It is also an object of the invention to remove any heavy oils from the well flow that may interfere with low temperature condensation and separation of the desirable hydrocarbons from the gas component of the well flow.

It is a further object of the invention to obtain the desired results without external refrigeration or outside cooling liquids.

In accomplishing these and other objects of the invention, as hereinafter pointed out, I have provided an improved method and apparatus illustrated in the accompanying drawings, wherein:

Fig. 1 is a diagrammatic view of an apparatus by which a stabilized gasoline product, a standard gravity of pipe line oil, and a required grade of sales gas are obtained from a high pressure well flowing a mixture of oil, gas and water.

Fig. 2 is a similar diagrammatic view of a modified form of the invention wherein those oils which might interfere with low temperature separation are removed.

Referring first to the form of the invention shown in Fig. 1:

1 designates a high pressure petroleum producing well having a high gas-oil ratio, for example, a gas-oil ratio of 4,000 to 10,000 or a flow of 1,000,000 cubic feet of gas and 100 to 250 barrels of liquid. The flow from wells of this character usually contains substantial amounts of free water and water vapor along with the petroleum gas and a high gravity oil, the gravity of which is in excess of the market standard. The gas component of the flow also contains large quantities of condensable hydrocarbons which may be removed and yet provide a sales gas of maximum market quality. As above stated, it is a purpose of the present invention to top the oil component of the flow and remove the condensate for treatment to obtain a stabilized hydrocarbon product such as gasoline, the sale of which is in addition to the sales gas and pipe line oil.

In carrying out the invention the combined well flow is discharged from a well 1 through a duct 2 into a high pressure separator 3 wherein the gas and liquid hydrocarbon components of the flow are separated from any free water content of the flow, the water being discharged through an outlet pipe 4 and the gas and oil components of the flow being discharged through a duct 5 leading to a low temperature separator 6. The oil and gas components of the flow are precooled by a heat exchanger 7 that is connected in the duct 5.

In order to prevent the formation of gas hydrates under low temperatures a hydrate inhibitor, such as glycol, is injected into the duct 5 ahead of the heat exchanger 7 through a pipe 8. The inhibitor mixes with the flow and prevents any remaining water and water vapor from combining with components of the gas in forming objectionable gas hydrates.

Since the gas flowing from the well is at high pressure and well within the retrograde condensation range, the precooled fluids are expanded into the separator 6 through an expansion valve 9 that is connected into the duct 5. Expansion of the gas produces the cold necessary to effect optimum condensation of the desirable hydrocarbon components which can be removed from the gas stream and still leave a required grade of sales gas. The separated sales gas is discharged from the separator 6 through a duct 10 leading through the heat exchanger 7 and may be connected to a gathering line of a gas transportation system. The gas, being cold as a result of expansion, is used as the cooling medium in the heat exchanger 7 for precooling the oil and gas mixture prior to expansion, thus resulting in a maximum low temperature in the separator 6. The combined water vapor and hydrate, being the heavier liquid, settles to the bottom and is drawn off from the low temperature separator through a pipe 6'. The oil and condensate mixture which are lighter weight liquids collect on top of the hydrate inhibitor and are discharged through a duct 11 to a depropanizer 12 by which the lighter fractions are removed, for example, the propane and more volatile fractions.

The depropanizer includes a fractionating tower 13 having a series of bubble trays 14, a liquid collecting tray 15 and a heater 16.

The inlet duct is connected with the upper portion of the tower 13 so that the liquid mixture flows downwardly over and through the respective trays 14 in countercurrent flow with vapors that are produced from the liquids upon heating thereof in the heater 16. The liquid reaching the collection tray 15 is circulated through the heater 16 by way of a pipe 17 and returned to the tower through a pipe 18 for collection in the bottom thereof. The vapors resulting from heating of the liquid move upwardly through a chimney 19 of the collection tray 15 for contact with the descending liquid, whereby the heavier vapors are absorbed by the descending liquid. The vapors that reach the top of the tower comprise propane and lighter fractions and are discharged through a duct 20 under control of a pressure regulator 21. These gases may be conducted to a suitable storage or used as fuel for the heater 16.

The liquid accumulating in the bottom of the tower is drawn off through a duct 22 and delivered to a stabilizer 23 which includes a tower 24 having a series of bubble trays 25 over and through which the liquid descends into a heater 26 wherein the liquid is heated and the evolved vapors travel upwardly through the tower in counterflow with the descending liquid. The vapors reaching the top of the tower 25 are gasoline vapors and are discharged through a duct 27 to an air cooler 28 to effect condensation and initial cooling thereof. After passing the air cooler the liquid contains considerable heat which is removed in a heat exchanger 29 that is connected into the cold gas discharge line 10. The cooled liquid or gasoline is discharged from the heat exchanger 29 and conducted to a suitable storage through a pipe line 30.

A portion of the gasoline product is used as a reflux liquid for admission to the upper end of the tower 24, this reflux liquid being returned to the tower 24 under pressure of a pump 31 by way of a pipe line 32. It is obvious that the lighter components of the oil are vaporized incidental to heating thereof and that the vapors mix with the vapors of the condensate to increase the quantity of the gasoline recovered from the well flow. The oil collecting in the bottom of the heater 26 is discharged through a pipe line 33 to an air cooler 34 and through a heat exchanger 35 so as to remove the heat prior to delivery to a pipe line or storage.

It is obvious that with the method and apparatus just described, desirable hydrocarbons are removed from the well flow in the form of a stabilized gasoline product while leaving separated sales gas and oil having maximum specification standards required of sales gas and pipe line oil. Thus the income of the producers is materially increased as a result of the recovery of the gasoline product. It is also obvious that the recovery is effected with a relatively simple and inexpensive apparatus without the use of external refrigerants or cooling liquids.

Some well flows contain a quantity of viscous oils which interfere with low temperature separation and when such oils are treated in accordance with the present invention, an apparatus as shown in Fig. 2 is used to enable removal of the viscous oils. In this form of the invention the flow from the well 36 is discharged to a water separator 37 where the free water is removed and discharged through a pipe 38. The gas and oil components of the flow, on being separated from the water, are discharged from the separator 37 through a pipe 39 having a hydrate inhibitor connection 40 whereby a hydrate inhibitor such as glycol is introduced into the flow for preventing formation of gas hydrates at the low temperatures under which the fluids are treated. The flow passes through a heat exchanger 41 where the flow is pre-cooled and then discharged through an expansion valve 42 into a separator 43. The expansion valve 42 is set to maintain a temperature in the separator 43, at which time heavy oils and condensible fractions separate from the gas. The oil and condensed fractions are discharged into a lower pressure separator 45 in which the oil is topped of the rich hydrocarbons to leave a salable pipeline oil. The salable oil is separately removed from the separator 45 through a pipe 46 and the toppings from the oil and previously condensed fractions are reunited with the gas from the separator 43. The separator 45 may also be provided with a hydrate inhibitor drawoff 48 as shown. The separated gas, on being discharged from the separator 43, is delivered through a duct 49 and passed through an expansion valve 50 into a low temperature separator 51 along with the light oils and condensate that are conducted through the pipe 47. The second stage expansion provides a temperature within the separator 51 at which optimum condensation may be obtained so as to increase recovery of desired products.

In order to prevent freezeups at the lower temperature and interference by gas hydrates, a hydrate inhibitor may be injected into the flow ahead of the valve 50 through a pipe line 52. The gas from the low temperature separator 51 is discharged as sales gas through a pipe 53 that is connected with the heat exchanger 41 whereby the cold discharge precools the incoming well flow, as previously described. After passing the heat exchanger 41 the sales gas retains sufficient cold to provide the cooling medium for a heat exchanger 54, later described. The condensates and light oils are discharged from the low temperature separator 51 into the upper end of a fractionating tower 55 through a conduit 56.

The fractionating tower 55 includes a series of bubble trays 57 by which the liquid is contacted by hot vapors which are evolved by heating of the liquid collecting upon a tray 58 of the tower, the liquid being withdrawn from the tray 58 through a pipe 59 which connects with a heater 60 wherein the liquid is heated and returned to the bottom of the tower through a pipe 61. The vapors evolved incidental to heating travel upwardly through the bubble trays 57 in contact with the descending liquid. Any vapors which reach the top of the tower are discharged through a pipe 62 under control of a pressure regulator 63. The liquid collecting in the bottom of the tower 55 is discharged through a pipe 64 which is connected with an air cooler 65 and the heat exchanger 54 so that the liquid flowing through the pipe 64 is cooled prior to delivery to storage.

A hydrate inhibitor containing water vapor is removed from the low temperature separator through an outlet pipe 66.

It is obvious that with the modified apparatus the viscous oils are removed after the first stage of expansion together with condensate of the heavier gas fractions so that they will not interfere with separation at the lower temperatures which have been effected by the second stage pressure reduction.

What I claim and desire to secure by Letters Patent is:

1. The method of processing a hydrocarbon gas and oil mixture under flow from a producing well to obtain a hydrocarbon product having gasoline specifications and leaving separate gas and oil products conforming to specifications of a pipeline gas and a pipeline oil, said method including, controlling temperature and pressure of said oil and gas mixture to effect separation of the oil and any readily condensible fractions from the gas of the mixture, discharging the separated oil and said condensed fractions to a lower pressure for topping the oil and vaporizing the condensed fractions to leave a pipeline oil, separately removing the pipeline oil, expanding the previously separated gas into a condensing zone of lower temperature and pressure maintained incidental to expansion of the gas, uniting toppings from said oil and the previously condensed fractions with said expanded gas to effect condensation of desirable fractions of said united components in the condensing zone of lower temperature and pressure, separately removing pipeline gas from said condensing zone of low temperature and pressure, removing the last obtained condensate from said zone of low temperature and pressure, and fractionating the last obtained condensate to separate lighter fractions from gasoline fractions thereof for obtaining a stable product having gasoline specifications.

2. The method of processing a hydrocarbon gas and oil mixture under flow from a producing well to obtain a hydrocarbon product having gasoline specifications and leaving separate gas and oil products conforming to specifications of a pipeline gas and a pipeline oil as described in Claim 1, including the additional step of cooling the gasoline product by effecting heat exchange of the gasoline product with the pipeline gas removed from the condensing zone of low temperature and pressure.

3. The method of processing a hydrocarbon gas and oil mixture under flow from a producing well to obtain a hydrocarbon product having gasoline specifications and leaving separate gas and oil products conforming to specifications of a pipeline gas and a pipeline oil as described in Claim 1, including the steps of precooling the initial oil and gas mixture and the gasoline product by heat exchange with the cold pipeline gas.

4. The method of processing a hydrocarbon gas and oil mixture while under flow to obtain a hydrocarbon product having gasoline specifications including, injecting a gas hydrate inhibitor into the mixture to prevent formation of objectionable gas hydrates upon subsequent lowering of the temperature and pressure, controlling temperature and pressure of said mixture to effect separation of the oil and any condensible fractions from the gas of the mixture, discharging the oil and said condensed fractions to a lower pressure for topping the oil, separately removing the oil and the gas hydrate inhibitor, expanding the previously separated gas into a condensing zone of lower temperature and pressure maintained incidental to expansion of the gas, uniting toppings from said oil and the previously condensed fractions with said expanded gas to effect condensation of desirable fractions of said united components in the condensing zone of lower temperature and pressure, separately removing gas from said condensing zone of low temperature and pressure, removing the last obtained condensate from said zone of low temperature and pressure, and fractionating the last obtained condensate to separate lighter fractions from gasoline fractions thereof for obtaining a stable product having gasoline specifications.

5. The method of processing a hydrocarbon gas and oil mixture while under flow to obtain a hydrocarbon product having gasoline specifications including, injecting a gas hydrate inhibitor into the mixture to prevent formation of objectionable gas hydrates upon subsequent lowering of the temperature and pressure, controlling temperature and pressure of said mixture to effect separation of the oil and any condensible fractions from the gas of the mixture, discharging the oil and said condensed fractions to a lower pressure for topping the oil, separately removing the oil and the gas hydrate inhibitor, injecting additional inhibitor into the gas stream to replace the said gas hydrate inhibitor in said gas stream, expanding the previously separated gas into a condensing zone of lower temperature and pressure maintained incidental to expansion of the gas, uniting toppings from said oil and the previously condensed fractions with said expanded gas to effect condensation of desirable fractions of said united components in the condensing zone of lower temperature and pressure, separately removing gas from said condensing zone of low temperature and pressure, removing the last obtained condensate from said zone of low temperature and pressure, and fractionating the last obtained condensate to separate lighter fractions from gasoline fractions thereof for obtaining a stable product having gasoline specifications.

6. The method of processing a hydrocarbon gas and oil mixture under flow from a producing well to obtain a hydrocarbon product having gasoline specifications and leaving separate gas and oil products conforming to specifications of a pipeline gas and a pipeline oil, said method including injecting a gas hydrate inhibitor into the oil and gas mixture to prevent formation of gas hydrates upon subsequent lowering of the temperature and pressure, controlling temperature and pressure of said oil and gas mixture to effect separation of the oil and any readily condensible fractions from the gas of the mixture, discharging the separated oil and said condensed fractions to a lower pressure for topping the oil and vaporizing the condensed fractions to leave a pipeline oil, separately removing the pipeline oil, expanding the previously separated gas into a condensing zone of lower temperature and pressure maintained incidental to expansion of the gas, uniting toppings from said oil and the previously condensed fractions with said expanded gas to effect condensation of desirable fractions of said united components in the condensing zone of lower temperature and pressure, separately removing pipeline gas from said condensing zone of low temperature and pressure, removing the last obtained condensate from said zone of low temperature and pressure, and fractionating the last obtained condensate to separate lighter fractions from gasoline fractions thereof for obtaining a stable product having gasoline specifications.

7. In the method of processing a hydrocarbon gas and oil mixture under flow from a producing well to obtain a hydrocarbon product having gasoline specifications and leaving separate gas and oil products conforming to specifications of a pipeline gas and a pipeline oil, as described in claim 6, including the step of injecting additional inhibitor into the gas stream to replace the gas hydrate inhibitor that may be removed with the oil.

References Cited in the file of this patent

UNITED STATES PATENTS

| | | |
|---|---|---|
| 1,568,028 | Swan | Dec. 29, 1925 |
| 2,135,319 | Bays | Nov. 1, 1938 |
| 2,151,248 | Vaughan | Mar. 21, 1939 |
| 2,183,986 | McCormick et al. | Dec. 19, 1939 |
| 2,214,678 | Raigorodsky | Sept. 10, 1940 |
| 2,225,949 | Bennett | Dec. 24, 1940 |
| 2,262,744 | Walker | Nov. 11, 1941 |
| 2,377,736 | White | Jan. 5, 1945 |
| 2,617,276 | Gard et al. | Nov. 11, 1952 |